United States Patent
Norris et al.

(10) Patent No.: US 7,412,722 B1
(45) Date of Patent: Aug. 12, 2008

(54) DETECTION OF SOFTSWITCH ATTACKS

(75) Inventors: Edward James Norris, Lancaster, MA (US); David Kenneth Dumas, Littleton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 671 days.

(21) Appl. No.: 10/215,410

(22) Filed: Aug. 8, 2002

(51) Int. Cl.
  *G06F 9/46* (2006.01)
  *G06F 9/00* (2006.01)
  *G06F 21/06* (2006.01)
  *G06F 21/20* (2006.01)

(52) U.S. Cl. .............................. 726/22; 726/23; 726/25; 713/189; 713/190; 713/192; 713/194; 709/224; 370/310; 370/277; 370/229; 370/352

(58) Field of Classification Search ................. 713/201; 709/224
See application file for complete search history.

(56) References Cited

U.S. PATENT DOCUMENTS

| | | | |
|---|---|---|---|
| 5,606,668 A | 2/1997 | Shwed .................. 395/200.11 |
| 5,793,763 A | 8/1998 | Mayes et al. ................ 370/389 |
| 5,828,846 A | 10/1998 | Kirby et al. ............ 395/200.68 |
| 5,884,025 A | 3/1999 | Bachr et al. ............ 395/187.01 |
| 5,991,881 A * | 11/1999 | Conklin et al. ................. 726/22 |
| 6,408,391 B1 * | 6/2002 | Huff et al. ...................... 726/22 |
| 6,907,533 B2 * | 6/2005 | Sorkin et al. ................... 726/22 |
| 7,124,440 B2 * | 10/2006 | Poletto et al. ................. 726/23 |
| 7,369,540 B1 * | 5/2008 | Giroti .......................... 370/352 |
| 2003/0084349 A1 * | 5/2003 | Friedrichs et al. ........... 713/201 |
| 2003/0217137 A1 * | 11/2003 | Roese et al. ................. 709/223 |
| 2003/0219008 A1 * | 11/2003 | Hrastar ....................... 370/352 |
| 2004/0003070 A1 * | 1/2004 | Fernald et al. ............... 709/223 |
| 2004/0078592 A1 * | 4/2004 | Fagone et al. ............... 713/201 |
| 2005/0177871 A1 * | 8/2005 | Roesch et al. ................. 726/13 |
| 2006/0187959 A1 * | 8/2006 | Devine et al. ............... 370/466 |
| 2008/0002669 A1 * | 1/2008 | O'Brien et al. ............. 370/352 |

OTHER PUBLICATIONS

Pending U.S. Appl. No. 09/548,547, Martin F. Roesch et al., filed Apr. 13, 2000.
NetFacade Data Sheet, Marketing Brochure, Nov. 9, 2000 (2 sheets).
Verizon Federal Network Systems Unit Upgrades Web Security Software, Media Contact: Mark Marchand, http://newscenter,verizon.com/proactive/newsroom/release.vtml?id=56669, Jun. 19, 2001 (3 Pages).
U.S. Appl. No. 09/548,547, Martin F. Roesch et al., filed Apr. 13, 2000.
Solutions: Insignus Softswitch; http://www.sonusset.com/solutions.cfm; Nov. 27, 2001 (print date); pp. 1-2.

(Continued)

*Primary Examiner*—Syed A. Zia (57) ABSTRACT

A security system (150) in a network includes a softswitch (440) and a detection unit (420). The detection unit (420) detects activity directed to the softswitch (440) and records the detected activity. In another implementation, a method for configuring a security device (150) for use in a network includes installing a detection unit (420) to monitor and record traffic directed to the security device (150), installing a deceptive operating system (430), installing a softswitch (440), and configuring the deceptive operating system (430) and softswitch (440) to mirror settings used in an active softswitch (140) in the network.

16 Claims, 6 Drawing Sheets

OTHER PUBLICATIONS

Know Your Enemy: Honeynets; Honeynet Project; http://project.honeynet.org; Jan. 14, 2002; pp. 1-9.

Softswitch: Next Generation telecommunications switching platform; Sun Microsystems; Jul. 2000; 25 pages.

Recourse-ManTrap; http://www.recourse.com/product/ManTrap; Recourse Technologies; Apr. 30, 2002 (print date); 6 pages.

Lance Spitzner et al.; Honeypots; http://www.enteract.com: Mar. 8, 2002; pp. 1-8.

* cited by examiner

DETECTION OF SOFTSWITCH ATTACKS

FIELD OF THE INVENTION

The present invention relates generally to communications systems and, more particularly, to systems and methods for detecting attacks in communications systems.

BACKGROUND OF THE INVENTION

Network attacks represent a major threat to the continuous operation of network devices. In a typical Distributed Denial of Service (DDoS) attack, for example, traffic emanates from a wide range of compromised systems, and packets from these systems are directed at one or more target hosts, e.g., web servers, in an attempt to overload the target hosts. When a DDoS attack occurs across an Internet Service Provider's (ISP's) network, the transmission network may become so congested that the ISP can no longer provide adequate service. Examples of DDoS attacks include Tribe Flood Network 2000 (TFN2K) and WinTrinoo.

TFN2K is a Synchronized (SYN) flood from multiple hosts to a single server on a network that prevents a Transmission Control Protocol/Internet Protocol (TCP/IP) server from servicing other users. An attacking device sends a counterfeit source address to the server so that a final acknowledgment to the server's SYNchronize-ACKnowledge (SYN-ACK) response in the handshaking sequence is not sent. As a result, the server continues to execute the handshaking sequence until the server either overloads or crashes.

Other successful attacks can occur because, but not limited to, buffer overflow, operating system or application misconfiguration, software error, weak authentication, or a combination of these vulnerabilities.

To date, major work on detecting network attacks has focused on signature based intrusion detection systems (IDS) mechanisms designed to recognize traffic based on simple rules. This strategy is ineffective in the global Internet environment.

Another approach to combating network attacks involves the use of honeypots. Honeypots are deception hosts that are typically deployed in a network with standard production-like operating and network configurations. If an intruder compromises or attacks the honeypot, the intruder's actions are recorded. A security administrator can use this recorded information to determine ways in which the basic system can be compromised. Conventional honeypots are generally associated with less complex systems, such as host devices. As network devices become more complex, it is desirable to use honeypots for improving security of these devices. One such complex device is a softswitch that routes calls between packet networks and the Public Switched Telephone Network (PSTN).

Therefore, there exists a need for systems and methods that improve the security of softswitches.

SUMMARY OF THE INVENTION

Systems and methods consistent with the present invention address this and other needs by providing a mechanism that improves network security and enhances a network administrator's ability to detect attacks on softswitches.

In accordance with the purpose of this invention as embodied and broadly described herein, a security system is disclosed. The security system includes a softswitch and a detection unit. The detection unit detects activity directed to the softswitch and records the detected activity.

In another implementation consistent with the present invention, a network includes at least one softswitch configured to route calls in the communications network and at least one device configured to emulate the at least one softswitch. The at least one device is further configured to capture traffic directed to the at least one device and store the captured traffic.

In yet another implementation consistent with the present invention, a method for configuring a security device is disclosed. The method includes installing at least one detection unit configured to monitor and record traffic directed to the security device, installing at least one deceptive operating system, installing a softswitch, and configuring the at least one deceptive operating system and softswitch to mirror settings used in at least one active softswitch in the network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide a security device for aiding in the detection of attacks to softswitches. The security device appears as an active softswitch in the network, but provides no switch functioning. Therefore, any traffic directed to the security device is considered suspicious. The security device captures and stores all traffic directed to it. When an attack occurs, the stored data provides the network administrator with a complete picture of the attack. This data can be used for analyzing compromises and intrusion attempts on a softswitch.

EXEMPLARY SYSTEM

Figure 1:
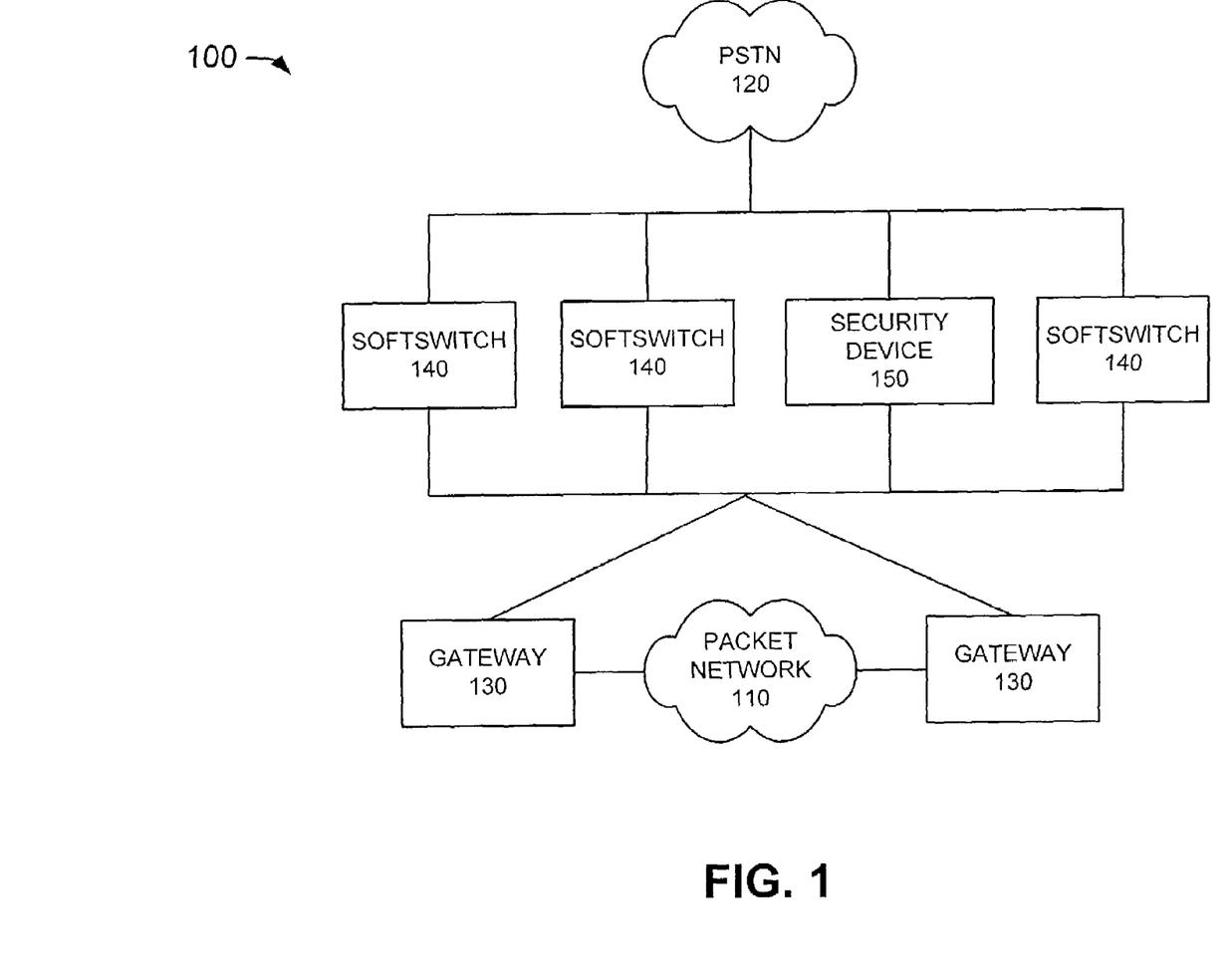
FIG. 1 illustrates an exemplary system in which systems and methods consistent with the present invention may be implemented.

FIG. 1 illustrates an exemplary system 100 in which systems and methods, consistent with the present invention, may be implemented. System 100 includes a packet network 110, a public switched telephone network (PSTN) 120, gateways 130, softswitches 140, and a security device 150. The number of components illustrated in FIG. 1 has been shown for simplicity. It will be appreciated that a typical system may include more or fewer components than illustrated in FIG. 1. Moreover, it will be appreciated that system 100 may include additional components, such as telephone devices, not shown in FIG. 1.

Packet network 110 may include one or more conventional networks, such the Internet, an intranet, a wide area network (WAN), a local area network (LAN), or other similar types of networks, capable of transmitting voice and/or data communications. PSTN 120 may include one or more conventional PSTNs or other similar types of networks that route voice communications using, for example, SS7, H.323, or other communication protocols. Gateways 130 may include devices for routing packet data from one network to another and for performing any necessary protocol conversions.

Softswitches 140 are software-based switching platforms capable of linking PSTN 120 to packet network 110 and managing traffic that contains voice, fax, data, and/or video. Softswitches 140 may include those softswitches produced by, for example, Sonus Networks, Inc. or Sylantro Systems Corp. The individual softswitches 140 may or may not be similarly configured.

Figure 2:
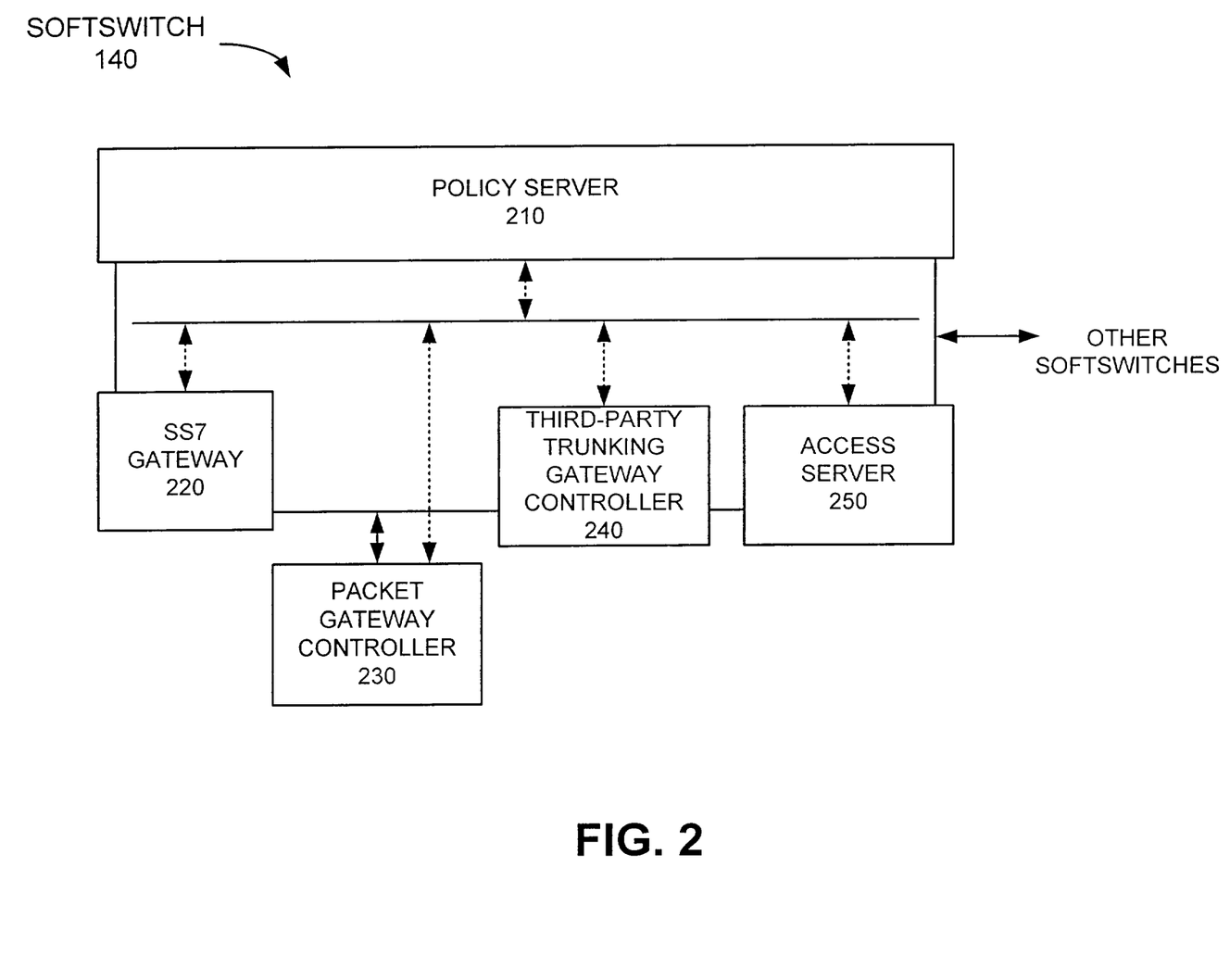
FIG. 2 illustrates an exemplary configuration of the softswitch of FIG. 1.

FIG. 2 illustrates an exemplary configuration of softswitch 140 of FIG. 1. It will be appreciated that the configuration illustrated in FIG. 2 is provided for explanatory purposes only and that many other configurations are possible. As illustrated, softswitch 140 includes a policy server 210, an SS7 gateway 220, a packet gateway controller 230, a third-party trunking gateway controller 240, and an access server 250. Softswitch 140 may further be associated with database applications (not shown) that allow for the provisioning of enhanced call handling services.

Policy server 210 is the primary component of softswitch 140 in that policy server 210 provides service selection and routing capabilities to SS7 gateway 220, packet gateway controller 230, third-party trunking gateway controller 240, and access server 250. SS7 gateway 220 translates telephone signaling messages for transmission over packet data networks and vice versa. Packet gateway controller 230 interacts with policy server 210 to provide call control and signaling for one or more packet gateways, such as gateway 130. Packet gateway controller 230 may support a variety of communication protocols, such as integrated services digital network (ISDN) primary rate interface (PRI), channel associated signaling (CAS), SS7/C7, H.323, session initiated protocol (SIP), and media gateway control protocol (MGCP).

Third-party trunking gateway controller 240 interacts with the policy server 210 to provide call control and signaling for one or more third party media gateways. Third-party trunking gateway controller 240 supports such communication protocols as MGCP and H.248, allowing controller 240 to control a variety of media gateways. Access server 250 interacts with policy server 210 to handle call setup and feature signaling. Access server 250 supports packet connectivity to a variety of integrated access devices (IADs), gateways, next-generation digital loop carriers (DLCs), and Internet protocol (IP) endpoints. Access server 250 supports basic local area calling features, as well as a variety of other features, such as lawful intercept, E911, 711, local number portability, directory and operator services, conferencing, and IP voicemail.

Returning to FIG. 1, security device 150 outwardly appears as a softswitch (i.e., it contains the functionality of a softswitch), but functions as a security tool by detecting unauthorized connections (or attacks) by an intruder. In essence, security device 150 acts as a honeypot (i.e., it is intended to be probed, attacked, and potentially exploited). Once attacked, security device 150 records all keystrokes and executed functions to aid, for example, in determining how the attack occurred, the scope of such an attack, whether other softswitches 140 were attacked, and how to recover from such an attack.

Figure 3:
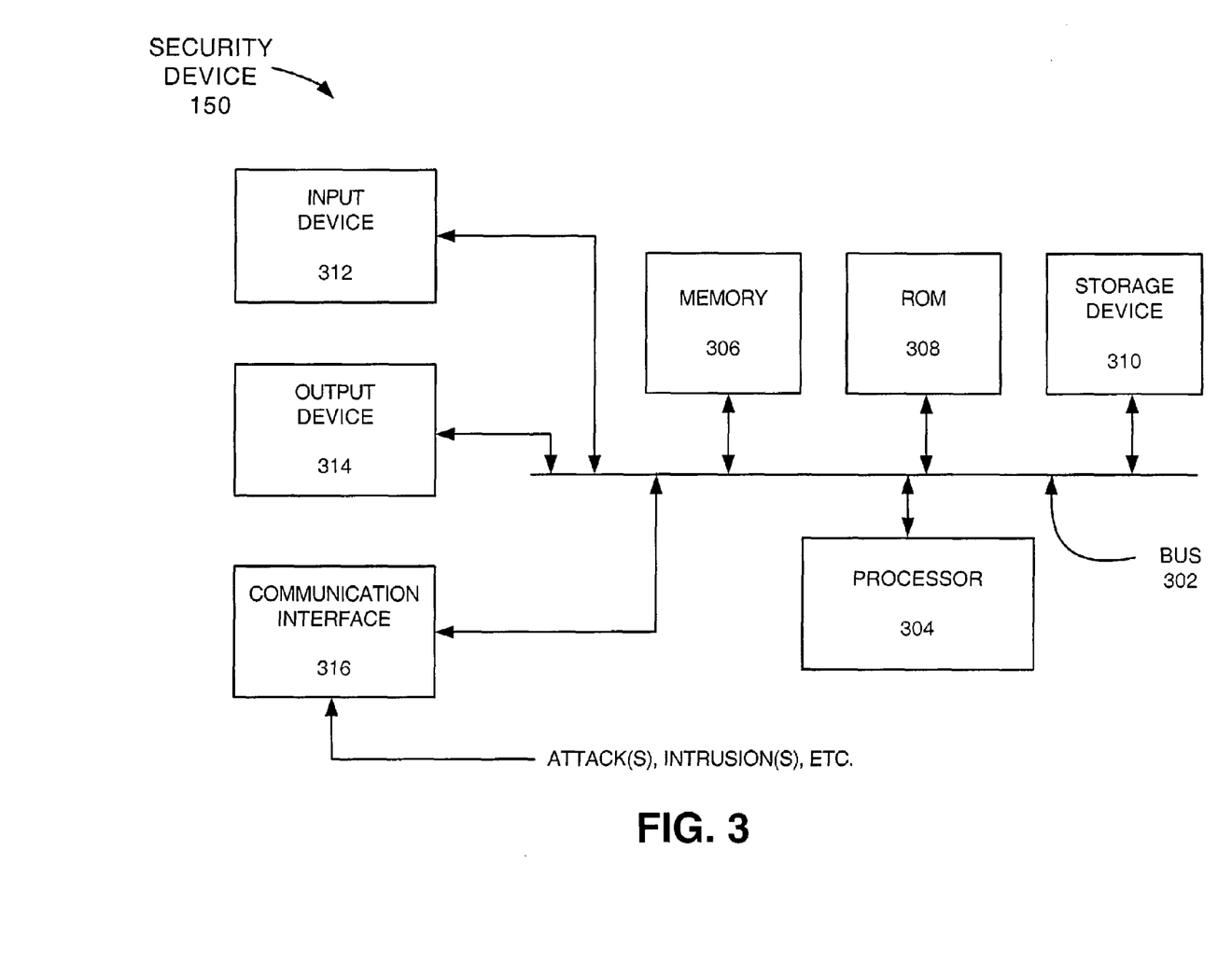
FIG. 3 illustrates an exemplary configuration of the security device of FIG. 1.

FIG. 3 illustrates an exemplary configuration of security device 150 of FIG. 1. As illustrated, security device 150 includes a bus 302, a processor 304, a main memory 306, a read only memory (ROM) 308, a storage device 310, an input device 312, an output device 314, and a communication interface 316. Bus 302 permits communication among the components of security device 150.

Processor 304 may include any type of conventional processor or microprocessor that interprets and executes instructions. Memory 306 may include a random access memory (RAM) or another dynamic storage device (referred to as main memory) that stores information and instructions for execution by processor 304. Main memory 306 may also be used to store temporary variables or other intermediate information during execution of instructions by processor 304.

ROM 308 may include a conventional ROM device and/or another static storage device that stores static information and instructions for processor 304. Storage device 310 may include a magnetic disk or optical disk and its corresponding drive and/or some other type of magnetic or optical recording medium and its corresponding drive for storing information and instructions.

Input device 312 may include one or more conventional mechanisms that permit an operator to input information to security device 150, such as a keyboard, a mouse, a pen, one or more biometric mechanisms, such as a voice recognition device, etc. Output device 314 may include one or more conventional mechanisms that output information to the operator, such as a display, a printer, a speaker, etc. Communication interface 316 is the portal or interface through which the unauthorized connections or attacks by an intruder(s) are received. Communication interface 316 may include any transceiver-like mechanism that enables security device 150 to communicate with other devices and/or systems, such as a network administrator device. For example, communication interface 316 may include a modem or an Ethernet interface to a network. Alternatively, communication interface 316 may include other mechanisms for communicating via a data network.

Security device 150 may implement the functions described below in response to processor 304 executing software instructions contained in a computer-readable medium, such as memory 306. A computer-readable medium may be defined as one or more memory devices and/or carrier waves. In alternative embodiments, hardwired circuitry may be used in place of or in combination with software instructions to implement the present invention. Thus, the present invention is not limited to any specific combination of hardware circuitry and software.

Figure 4:
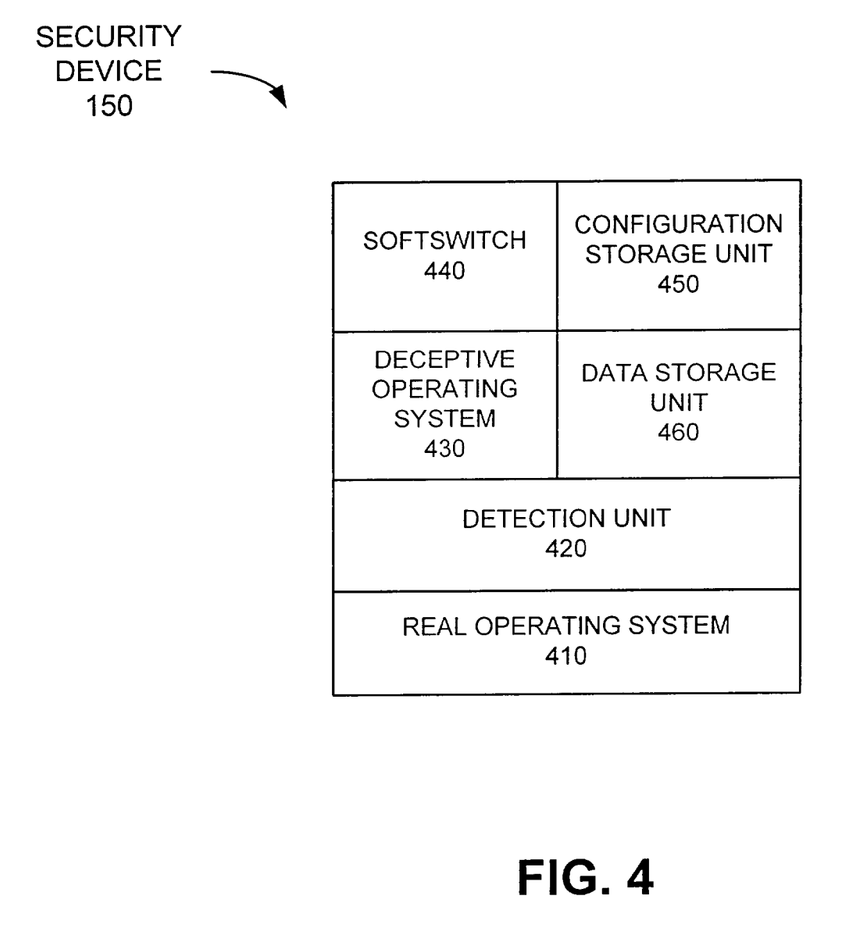
FIG. 4 illustrates an exemplary functional block diagram of the security device of FIG. 1.

FIG. 4 illustrates an exemplary functional block diagram of security device 150 of FIG. 1. It will be appreciated that other configurations are possible. As illustrated, security device 150 includes an operating system 410, a detection unit 420, a deceptive operating system 430, a softswitch 440, a configuration storage unit 450, and a data storage unit 460.

Operating system 410 includes the real operating system platform for security device 150. In one implementation consistent with the present invention, operating system 410 may be implemented using Solaris as the operating system platform. Other operating systems are possible. Detection unit 420 acts to detect, contain, and monitor intrusions to security device 150. As described above, security device 150 looks and acts like a softswitch though it performs no production or operating environment switching functions. As a result, all activity directed to security device 150 is detected by detection unit 420 as a possible intrusion. Detection unit 420 may then record all keystrokes and functions invoked by the intruder. In one implementation consistent with the present invention, detection unit 420 may be implemented using ManTrap® from Symantec Corp.

Deceptive operating system 430 emulates an operating system that may be implemented on a softswitch, such as softswitches 140. Deceptive operating system 430 allows intruders to compromise and interact with deceptive operating system 430 as they would an actual operating system. Softswitch 440 emulates one or more of softswitches 140. Similar to deceptive operating system 430, softswitch 440 allows intruders to compromise and interact with softswitch 440 as they would an actual softswitch. Configuration storage unit 450 stores operating system and softswitch configuration data to enable deceptive operating system 430 and softswitch 440 to emulate softswitches 140. This data may include, for example, the necessary software for emulating policy server 210, SS7 gateway 220, packet gateway controller 230, third-party trunking gateway controller 240, and access server 250. Data storage unit 460 may store packets captured by security device 150 from connections to security device 150. Data storage unit 460 may also store the keystrokes and functions executed by an intruder during possible attacks.

EXEMPLARY PROCESSING

Figure 5:
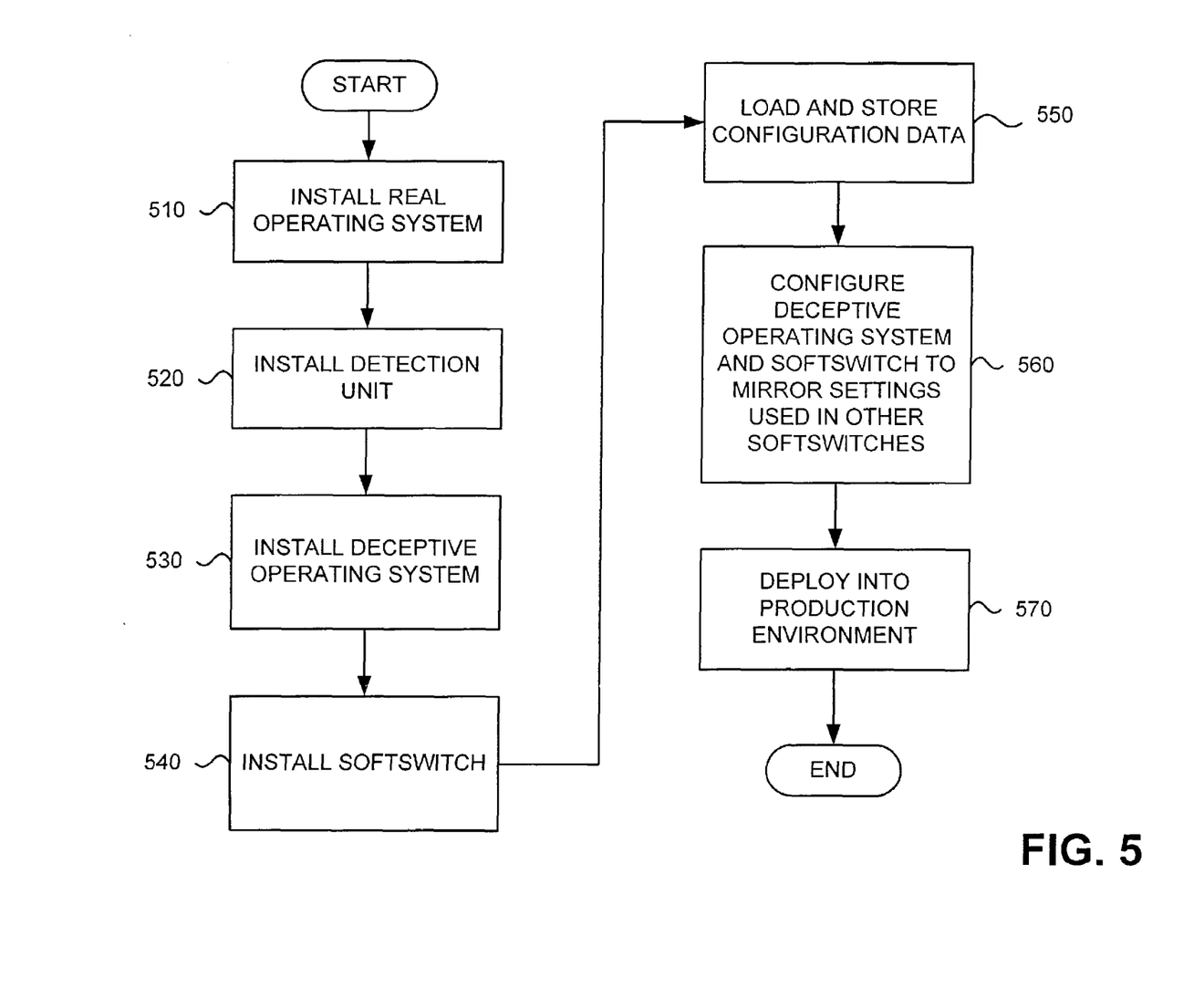
FIG. 5 illustrates an exemplary process for configuring a security device in an implementation consistent with the present invention.

FIG. 5 illustrates an exemplary process for configuring security device 150 in an implementation consistent with the present invention. Processing may begin by installing operating system 410 in security device 150 in a well-known manner [act 510]. In one implementation, installing operating system 410 may involve the installation of the Solaris operating system platform in security device 150. Once operating system 410 is installed, detection unit 420 may be installed [act 520]. This installation may involve the installation of the ManTrap® product by Symantec Corp.

Deceptive operating system 430 may be installed on top of detection unit 420 [act 530]. Softswitch 440 may then be installed [act 540]. Security device 150 may receive configuration data for configuring deceptive operating system 430 and softswitch 440 to emulate one or more of softswitches 140 [act 550]. The configuration data may be entered by a system administrator or received automatically via another device. Security device 150 may store the configuration data in configuration storage unit 450 [act 550]. Once the configuration data has been received, deceptive operating system 430 and softswitch 440 may be configured to mirror the settings used in one or more of softswitches 140 [act 560]. Security device 150 may then be deployed into a production environment where it appears to be a typical softswitch [act 570].

Figure 6:
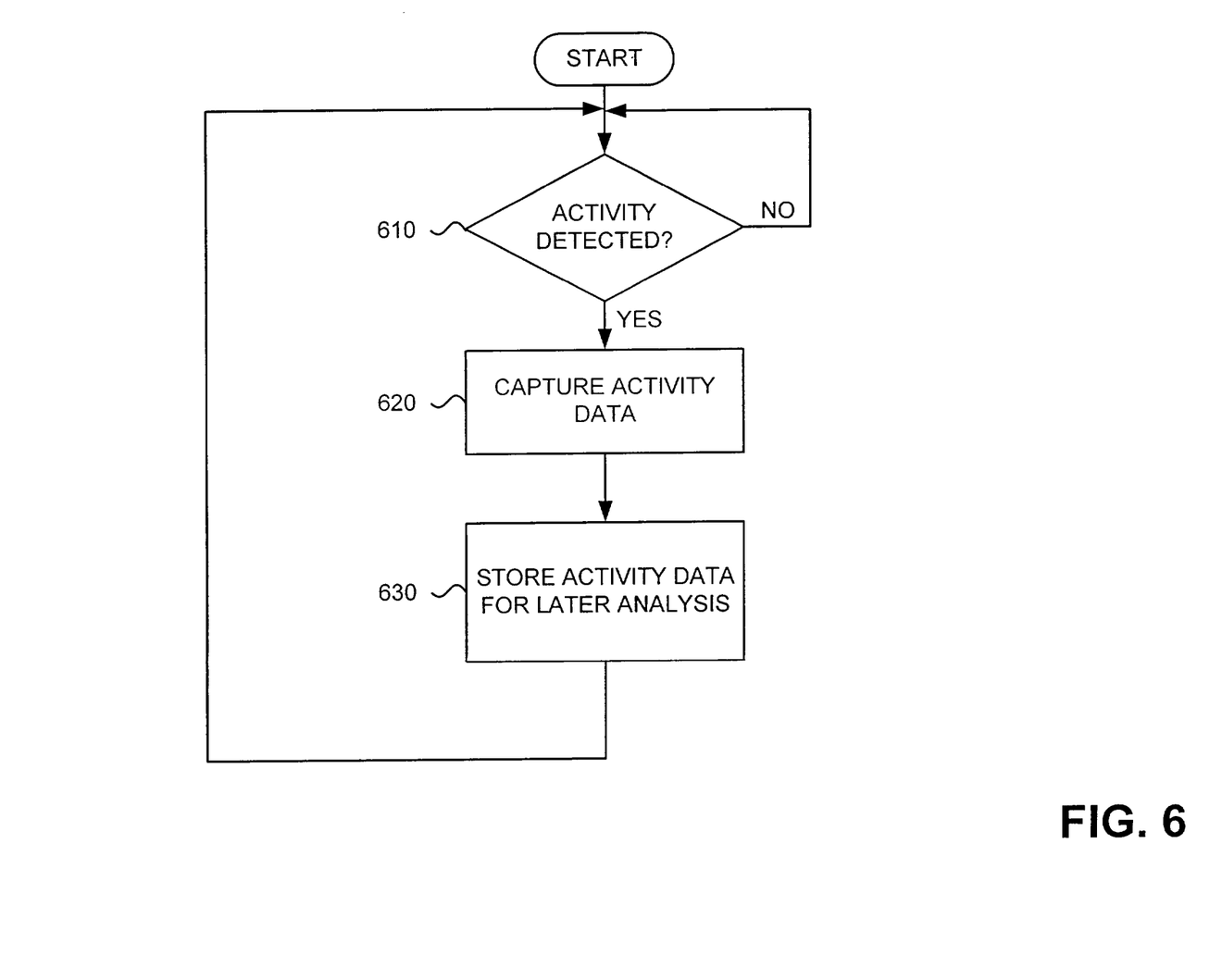
FIG. 6 illustrates an exemplary process for operating a security device in an implementation consistent with the present invention.

FIG. 6 illustrates an exemplary process for operating security device 150 in an implementation consistent with the present invention. Processing may begin with security device 150 determining whether any activity has been detected [act 610]. As described above, security device 150 looks and acts like a typical softswitch 140, however, it does not perform any switching functions. Therefore, all activity directed to security device 150 is likely an unauthorized probe, scan, or even an attack.

If no activity is detected, processing may return to act 610. If activity is detected, security device 150 captures the activity directed to security device 150 to give a system administrator a complete picture of the intrusion [act 620]. Because security device 150 looks and acts like a fully functioning softswitch 140, intruders may spend more time exploring and attempting to manipulate security device 150. As a result, security device 150 provides a greater opportunity to observe intruders' techniques and targets directed to softswitches.

Security device 150 may then store all of the captured data in, for example, data storage unit 460 [act 630] after which processing may return to act 610. This data may later be used for analyzing the intrusion or for taking remedial actions. In the case of an attack, a system administrator may use the data to determine such information as how the attack occurred, the scope of the attack, how to detect if actual softswitches 140 were attacked, how to recover from the attack, whether the intruder can cause denial of service attacks by changing the routing tables of softswitches 140, whether the intruder can commit telephone fraud by reconfiguring softswitches 140, and the like.

Conventional security techniques often involve wading through gigabytes of data to find the data needed to analyze an attack. By contrast, security device 150 collects very little data. Since security device 150 does not actively perform softswitching functions, the data collected by security device 150 is normally of high value. The data may include not only connection attempts, but also the actions that the attacker takes once he/she gains access into the security device 150. As a result, system administrators can quickly and easily identify the data necessary for analyzing an attack.

In one implementation, security device 150 may alert a system administrator when a compromise or attack has been detected. This may allow the system administrator to thwart an attack in its early stages.

CONCLUSION

Systems and methods, consistent with the present invention, provide a security device for aiding in the detection of attacks to softswitches. The security device appears as an active softswitch in the network, but provides no production or operating environment switch functioning. Therefore, any traffic directed to the security device is considered suspicious. The security device captures and stores all traffic directed to it. When an attack occurs, the stored data provides the network administrator with a complete picture of the attack. This data can be used for analyzing compromises and intrusion attempts on a softswitch.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on a security device that emulates a softswitch, the present invention is not so limited. In fact, the techniques described herein are equally applicable to other network devices.

The above implementations can be implemented in software, hardware, or a combination of software and hardware. Thus, the present invention is not limited to any specific combination of hardware circuitry and software.

While series of acts have been described with regard to FIGS. 5 and 6, the order of the acts may be varied in other implementations consistent with the present invention. Moreover, non-dependent acts may be implemented in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A security device, comprising:
   a softswitch emulator that performs no switching functions;
   a communication interface configured to connect the security device to a data network;
   a detection unit configured to:
     detect activity directed to the softswitch emulator, and record detected activity
   a deceptive operating system that is configured to emulate a softswitch operating system; and
   a first storage unit configured to:
     store first data for configuring the softswitch emulator to mirror at least one active softswitch connected to the data network, and
     store second data for configuring the deceptive operating system to emulate an operating system of the at least one active softswitch.

2. The security device of claim 1, wherein the data network is a packet network.

3. The security device of claim 1, further comprising a second interface for connecting to a public switched telephone network.

4. The A security device, comprising:
   a softswitch emulator that performs no switching functions;
   a communication interface configured to connect the security device to a data network;
   a deceptive operating system that is configured to emulate a softswitch operating system; and
   a detection unit configured to:
     detect activity directed to the softswitch emulator;
     record detected activity;
     detect activity directed to the deceptive operating system; and
     record the detected activity directed to the deceptive operating system.

5. A security device, comprising:
   a softswitch emulator that performs no switching functions;
   a communication interface configured to connect the security device to a data network;
   a detection unit configured to:
     detect activity directed to the softswitch emulator and record detected activity;
   a deceptive operating system that is configured to emulate a softswitch operating system; and
   a real operating system platform for the security device.

6. A security device, comprising:
   a softswitch emulator that performs no switching functions;
   a communication interface configured to connect the security device to a data network;
   a deceptive operating system that is configured to emulate a softswitch operating system;
   a detection unit configured to:
     detect activity directed to the softswitch emulator;
     record detected activity; and
     record at least one of keystrokes when recording the detected activity and functions executed by the softswitch when recording the detected activity.

7. A method, comprising:
   connecting a security device to a data network, wherein the security device includes a softswitch emulator that performs no switching functions;
   monitoring traffic directed to the security device; and
   recording the traffic directed to the security device;
   wherein the security device includes a deceptive operating system and wherein the recording includes:
     capturing at least one of keystrokes and functions executed by the softswitch emulator directed to the deceptive operating system, and
     storing the at least one of keystrokes and executed functions.

8. The method of claim 7, wherein the data network is an active network that includes a functioning softswitch.

9. The method of claim 7, wherein the data network is a packet network.

10. The method of claim 7, further comprising connecting the security device to a public switched telephone network.

11. The method of claim 8, further comprising analyzing the recorded traffic to determine a vulnerability of the functioning softswitch to network attacks.

12. A security device, comprising:
    a softswitch emulator that performs no switching functions;
    a real operating system platform for the security device;
    a deceptive operating system that is configured to emulate a softswitch operating system wherein the softswitch emulator and the deceptive operating system are configured to mirror settings in one or more softswitches in a data network;
    a communication interface that connects the security device to the data network; and
    a detection unit that monitors activity in the data network and that is configured to:
      detect activity directed to the softswitch emulator,
      record detected activity,
      detect activity directed to the deceptive operating system, and
      record the detected activity directed to the deceptive operating system.

13. The security device of claim 12, wherein the data network is a packet network.

14. The security device of claim 12, further comprising a second interface for connecting to a public switched telephone network.

15. A security device, comprising:
    a softswitch emulator that performs no switching functions;
    a real operating system platform for the security device;
    a deceptive operating system that is configured to emulate a softswitch operating system, wherein the softswitch emulator and the deceptive operating system are configured to mirror settings in one or more softswitches in a data network;
    a communication interface that connects the security device to the data network; and
    a detection unit that monitors activity in the data network and that is configured to:
      detect activity directed to the softswitch emulator, and
      record detected activity; and
    a first storage unit configured to:
      store first data for configuring the softswitch emulator to mirror at least one active softswitch connected to the data network, and
      store second data for configuring the deceptive operating system to emulate an operating system of the at least one active softswitch.

16. A security device, comprising:
    a softswitch emulator that performs no switching functions;

a real operating system platform for the security device;

a deceptive operating system that is configured to emulate a softswitch operating system, wherein the softswitch emulator and the deceptive operating system are configured to mirror settings in one or more softswitches in a data network;

a communication interface that connects the security device to the data network; and a detection unit that monitors activity in the data network and that is configured to:
  detect activity directed to the softswitch emulator
  record detected activity, and
  record at least one of keystrokes when recording the detected activity and functions executed by the softswitch when recording the detected activity.

* * * * *